(12) United States Patent
Baba (10) Patent No.: US 10,049,577 B2
(45) Date of Patent: Aug. 14, 2018

(54) OBJECT DETECTION APPARATUS

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/513,528

(22) PCT Filed: Sep. 11, 2015

(86) PCT No.: PCT/JP2015/075791
§ 371 (c)(1),
(2) Date: Mar. 22, 2017

(87) PCT Pub. No.: WO2016/047460
PCT Pub. Date: Mar. 31, 2016

(65) Prior Publication Data
US 2017/0309180 A1    Oct. 26, 2017

(30) Foreign Application Priority Data
Sep. 24, 2014    (JP) ................... 2014-193893

(51) Int. Cl.
| G06K 9/00 | (2006.01) |
| G08G 1/16 | (2006.01) |
| G01S 13/93 | (2006.01) |
| G01S 13/86 | (2006.01) |
| G06K 9/62 | (2006.01) |

(52) U.S. Cl.
CPC ............ *G08G 1/166* (2013.01); *G01S 13/867* (2013.01); *G01S 13/93* (2013.01); *G06K 9/00805* (2013.01); *G06K 9/6215* (2013.01)

(58) Field of Classification Search
None
See application file for complete search history.

(56) References Cited

U.S. PATENT DOCUMENTS

| 2006/0008120 A1 | 1/2006 | Ohkubo |
| 2010/0085238 A1 | 4/2010 | Muller-Frahm et al. |
| 2012/0300078 A1 | 11/2012 | Ogata et al. |
| 2014/0139369 A1 | 5/2014 | Baba |

FOREIGN PATENT DOCUMENTS

| JP | 2004-347471 A | 12/2004 |
| JP | 2013/020507 | 1/2013 |
| JP | 2014/154005 | 8/2014 |

*Primary Examiner* — Stephen Coleman
(74) *Attorney, Agent, or Firm* — Knobbe, Martens, Olson & Bear, LLP (57) ABSTRACT

In an object detection apparatus, a proximity determination unit determines whether or not a first object and a second object are in close proximity to each other, where the first object is an object detected based on detection information acquired from a radar and the second object is an object detected based on a captured image acquired from a monocular camera. A sameness determination unit determines that the first object and the second object are the same object, if it is determined that the first object and the second object are in close proximity to each other and if a difference between a first collision time with the first object and a second collision time with the second object is less than a reference value.

6 Claims, 5 Drawing Sheets

NORMAL CASE

FIG.5

FIG.6

OBJECT DETECTION APPARATUS

CROSS-REFERENCE TO RELATED APPLICATION

This application is based on and claims the benefit of priority from earlier Japanese Patent Application No. 2014-193893 filed Sep. 24, 2014, the description of which is incorporated herein by reference.

TECHNICAL FIELD

The present invention relates to techniques for detecting objects using a radar and a camera.

BACKGROUND ART

Vehicle collision avoidance systems are required to accurately detect objects, such as a vehicle other than an own vehicle that is a vehicle carrying the system and a pedestrian. For example, a vehicle collision avoidance system as disclosed in Patent Literature 1 is configured to detect objects using a radar and a camera. More specifically, the disclosed vehicle collision avoidance system uses a millimeter-wave radar and a monocular camera separately, and if a positional relationship between an object detected by the millimeter-wave radar and an object detected by the monocular camera meets a predetermined criteria (particularly, if these objects are in close proximity to each other), determines that these objects are the same object.

CITATION LIST

Patent Literature

[Patent Literature 1] JP-A-2014-122873

SUMMARY OF THE INVENTION

Technical Problem

However, in a situation where an object detected by the millimeter-wave radar and an object detected by the monocular camera are in close proximity to each other, these objects may be mistakenly recognized as the same object even if they are different objects.

In consideration of the foregoing, exemplary embodiments of the present invention are directed to providing an object detection apparatus capable of accurately determining whether or not objects detected using a radar and a camera are the same object.

Solution to Problem

In accordance with an exemplary embodiment of the present invention, there is provided an object detection apparatus. In the apparatus, a first region definition unit is configured to define a first object region including a first detection point representing a relative position of the first object with respect to a reference point in an XY-plane with an X-axis direction of the XY-plane being a vehicle widthwise (or lateral) direction and a Y-axis direction of the XY-plane being a vehicle lengthwise (or longitudinal) direction, where the first object is an object detected based on detection information acquired from a radar. The second region definition unit is configured to define a second object region including a second detection point representing a relative position of a second object with respect to the reference point in the XY-plane, where the second object is an object detected based on a captured image acquired from a monocular camera. The collision time acquisition unit is configured to acquire a first collision time with the first object and a second collision time with the second object. A sameness determination unit is configured to, if there is an overlap of the first object region and the second object region in the XY-plane and if a difference between the first collision time with the first object and the second collision time with the second object is less than a reference value, determine that the first object and the second object are a same object.

Such a configuration of the object detection apparatus, where not only if there is an overlap of the first object region and the second object region, but also if a difference between the first collision time with the first object and the second collision time with the second object is less than a reference value, it is determined that the first object and the second object are the same object, enables more accurate determination as to whether or not the first object and the second object are the same object.

The above and other objects, features and advantages of the present invention will be readily apparent and fully understood from the following detailed description of preferred embodiments, taken in connection with the appended drawings.

DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

(Configuration)

A collision mitigation apparatus 1 in accordance with one embodiment of the present invention is an apparatus mounted in a mobile object, such as a vehicle. A vehicle carrying the collision mitigation apparatus 1 is hereinafter referred to as an own vehicle. The collision mitigation apparatus 1 is configured to detect an object (that is an object, such as a vehicle other than the own vehicle or a pedestrian) using a radar and a camera image, and in cases where the own vehicle is likely to collide with the object, perform control operations, such as braking the own vehicle, to avoid the collision or mitigate the impact of any possible collision between the object and the own vehicle. Particularly, the collision mitigation apparatus 1 of the present embodiment has the capability of accurately recognizing whether or not an object detected by the radar and an object detected by the camera are one object (i.e., the same object).

Figure 1A:
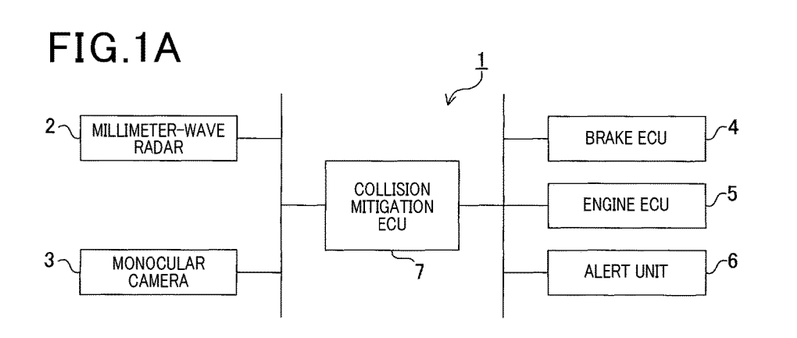
FIG. 1A is a block diagram of a collision mitigation apparatus in accordance with one embodiment of the present invention.

The collision mitigation apparatus 1, as shown in FIG. 1A, includes a millimeter-wave radar 2, a monocular camera 3, a brake electronic control unit (ECU) 4, an engine ECU 5, an alert unit 6, and a collision mitigation ECU 7. In the collision mitigation apparatus 1, for example, the collision mitigation ECU 7 is communicably connected to the millimeter-wave radar 2, the monocular camera 3, the brake ECU 4, the engine ECU 5, and the alert unit 6. Configurations to implement the communications are not particularly limited.

The millimeter-wave radar 2 is mounted in the front center (leading edge) of the own vehicle to detect objects, such as other vehicles and pedestrians, by using millimeter waves. The millimeter-wave radar 2 transmits millimeter waves forward from the own vehicle while scanning in a horizontal plane and receives millimeter waves reflected back to thereby transmit transmitted and received data in the form of radar signals to the collision mitigation ECU 7.

The monocular camera 3 includes a charge-coupled device (CCD) camera, and is mounted in the front center of an occupant compartment in the own vehicle. The monocular camera 3 transmits data of captured images in the form of image signals to the collision mitigation ECU 7.

The brake ECU 4 includes CPU, ROM, RAM, and others to control braking of the own vehicle. More specifically, the brake ECU 4 controls a brake actuator (brake ACT) in response to a detection value outputted from a sensor to detect a brake pedal depression amount, where the brake actuator serves as an actuator that opens and closes a pressure increasing control valve and a pressure reducing control valve provided in a brake hydraulic circuit. The brake ECU 4 controls the brake actuator following instructions from the collision mitigation ECU 7 so as to increase a braking force of the own vehicle.

The engine ECU 5 includes CPU, ROM, RAM, and others to control engine start/shutdown, a fuel injection amount, the ignition time, and others. More specifically, the engine ECU 5 controls a throttle actuator (throttle ACT) in response to a detection value outputted from a sensor to detect an accelerator pedal depression amount, where the throttle actuator serves as an actuator that opens and closes a throttle valve provided in an air intake conduit. The engine ECU 5 controls the throttle actuator following instructions from the collision mitigation ECU 7 so as to decrease a driving force of the internal-combustion engine.

The alert unit 6, upon reception of a warning signal from the collision mitigation ECU 7, acoustically and optically alerts a driver of the own vehicle.

The collision mitigation ECU 7 includes CPU, ROM, RAM, and others to integrally control the collision mitigation apparatus 1. The collision mitigation ECU 7 acquires radar signals from the millimeter-wave radar 2 and image signals from the monocular camera 3 every predetermined time interval based on a master clock of the CPU.

(Processing)

Figure 2:
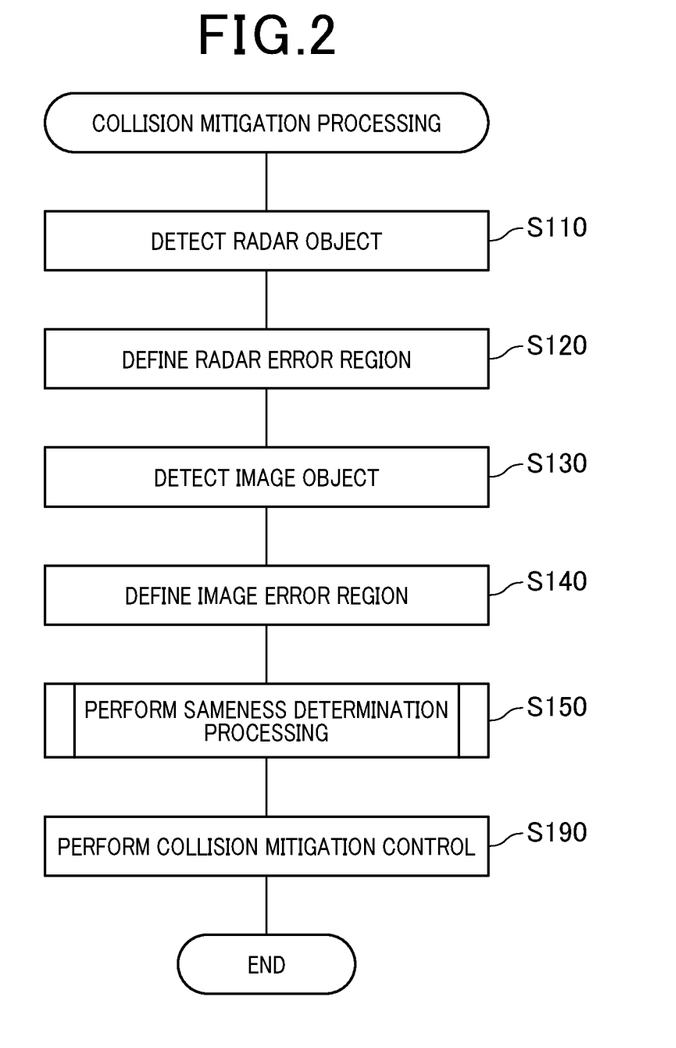
FIG. 2 is a flowchart of collision mitigation processing to be performed in the collision mitigation ECU.

There will now be described object detection and collision mitigation processing to be performed in the collision mitigation apparatus 1. A collision mitigation program, i.e., a program for the collision mitigation apparatus 1 to implement the object detection and collision mitigation processing, is stored in the collision mitigation ECU 7. This collision mitigation processing to be performed by the collision mitigation ECU 7 executing the program will be described with reference to FIG. 2. FIG. 2 illustrates a flowchart of the processing to be performed in the collision mitigation ECU 7 every predetermined time interval.

First, in the collision mitigation processing, as shown in FIG. 2, the collision mitigation ECU 7 detects an object based on a radar signal transmitted from the millimeter-wave radar 2 (i.e., detection information from the millimeter-wave radar 2) (step S110). More specifically, based on the radar signal, the collision mitigation ECU 7 calculates (or determines) a linear distance from the own vehicle to the object and a horizontal azimuth angle of the object (i.e., an angular position of the object from the direction ahead of the own vehicle).

Figure 3:
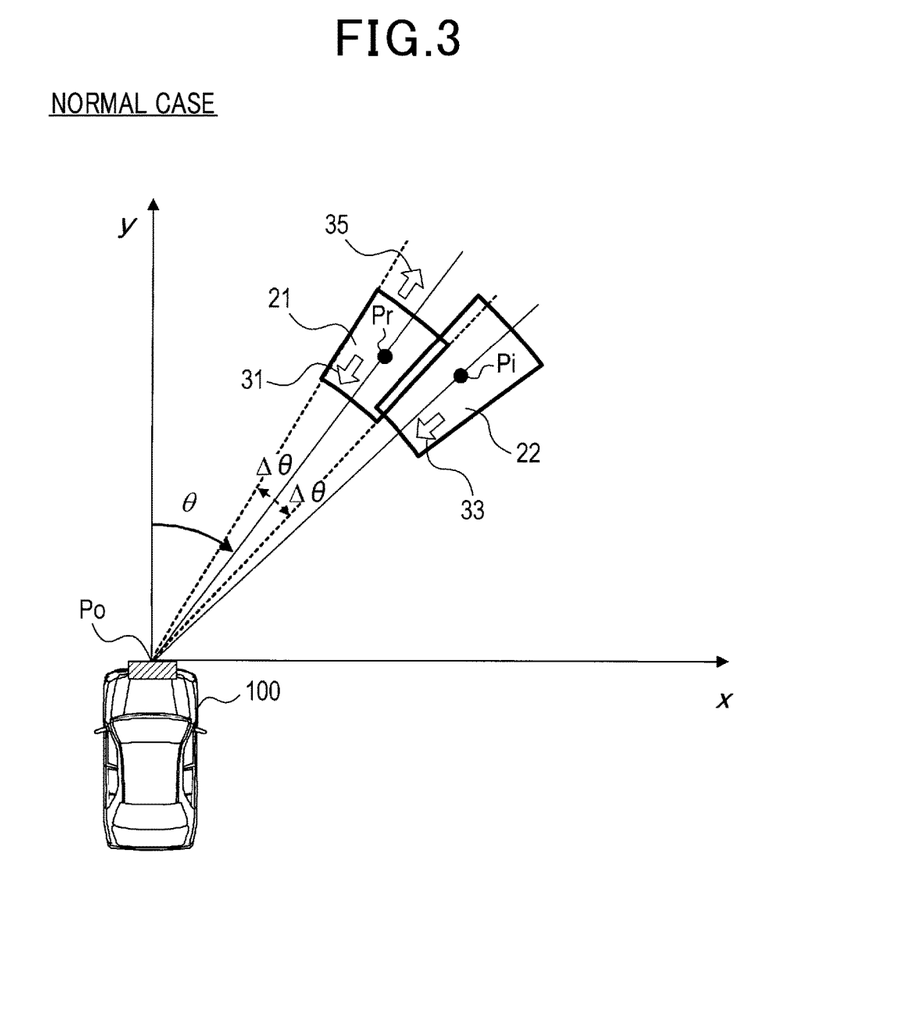
FIG. 3 is a plan view of error regions.

Based on these calculated values, the collision mitigation ECU 7, as shown in FIG. 3, calculates or determines position coordinates (X- and Y-coordinates) of the object in the XY-plane as a detection point Pr of the object in the XY-plane. The X-axis of the XY-plane represents a vehicle-widthwise direction (transverse direction) of the own vehicle, and the Y-axis of the XY-plane represents a vehicle-lengthwise direction of the own vehicle (a direction ahead of the own vehicle). The detection point Pr of an object having a plurality of detection points detected by the millimeter-wave radar 2 in an object-widthwise direction is set in the middle of the plurality of detection points.

A reference point Po of the XY-plane is set at a nose (or front end) of the own vehicle, on which the millimeter-wave radar 2 is mounted. The detection point Pr is a relative position of the object with respect to the reference point Po. FIG. 3 illustrates an example of an object located ahead of and to the right of the own vehicle. Additionally, in step S110, the collision mitigation ECU 7 may calculate, in addition to the detection point Pr of the object, a relative speed and the like of the object with respect to the own vehicle. In the following, the object detected in step S110 (the object detected based on the detection information from the millimeter-wave radar 2) will be referred to as a "radar object."

Subsequently, as shown in FIG. 3, the collision mitigation ECU 7 defines a radar error region 21 centered at the detection point Pr calculated in step S110 (step S120). More specifically, the radar error region 21 has a two-dimensional extension (specified by AO) centered at the detection point Pr, where an extension of the radar error region 21 in the X-axis direction represents a range of assumed error around the X-coordinate of the detection point Pr and an extension of the radar error region 21 in the Y-axis direction represents a range of assumed error around the Y-coordinate of the detection point Pr. These ranges of assumed error are predetermined based on the characteristics of the millimeter-wave radar 2.

Subsequently, the collision mitigation ECU 7 detects an object based on an image signal transmitted from the monocular camera 3 (i.e., a captured image from the monocular camera 3) (step S130). More specifically, the collision mitigation ECU 7 applies image analysis to the captured image represented by the image signal to identify an object. This identification may be implemented by matching processing using prestored object models.

An object model is prepared for each object type, such as a vehicle, a pedestrian, or the like, which allows not only determination of the presence of an object, but also identification of its object type. The collision mitigation ECU 7 determines a Y-coordinate of the object in the XY-plane based on a vertical position of the object in the captured image, and a horizontal azimuth angle of the object (an angular position from the direction ahead of the own vehicle) based on a horizontal position of the object in the capture image.

As the object is located more distant from the own vehicle in the direction ahead of the own vehicle, that is, as the Y-coordinate of the object is increased, a lower end of the object tends to be located at a higher position in the captured image. This allows the Y-coordinate of the object to be determined based on the lower end position of the object in the captured image. In such a specific manner, however, inaccurate detection of the lower end position of the object will leads to lower accuracy in detecting the Y-coordinate of the object.

In addition, a horizontal displacement of the object from the focus of expansion (FOE) of the monocular camera 3 tends to increase with an increasing angular displacement (inclination) of the object from the direction ahead of the own vehicle (specifically, a line of X=0). This allows a horizontal azimuth angle of the object to be determined based on a distance from the FOE to a vertical line passing through the center of the object.

As such, in step S130, the collision mitigation ECU 7 determines the Y-coordinate and the horizontal azimuth angle (angular position) of the object in the XY-plane as the detection point Pi of the object in the XY-plane, as shown in FIG. 3. The detection point Pi of the object is set, for example, in the center in the object's width direction. The detection point Pi of the object represents a relative position of the object with respect to the reference point Po. In the following, the object detected in step S130 (the object detected based on the captured image from the monocular camera 3) will be referred to as an "image object."

Subsequently, as shown in FIG. 3, the collision mitigation ECU 7 defines an error region 22 centered at the detection point Pi of the image object calculated in step S130 (step S140). More specifically, the error region 22 has a two-dimensional extension centered at the detection point Pi, where an extension of the error region 22 in the Y-axis direction represents a range of assumed error around the Y-coordinate of the detection point Pi and an extension of the error region 22 in the horizontal azimuth angle direction represents a range of assumed error around the horizontal azimuth angle of the detection point Pi. These ranges of assumed error are predetermined based on the characteristics of the monocular camera 3.

Subsequently, sameness determination processing is performed (step S150). In the sameness determination processing, the collision mitigation ECU 7 determines whether or not the radar object and the image object are the same object.

Figure 4:
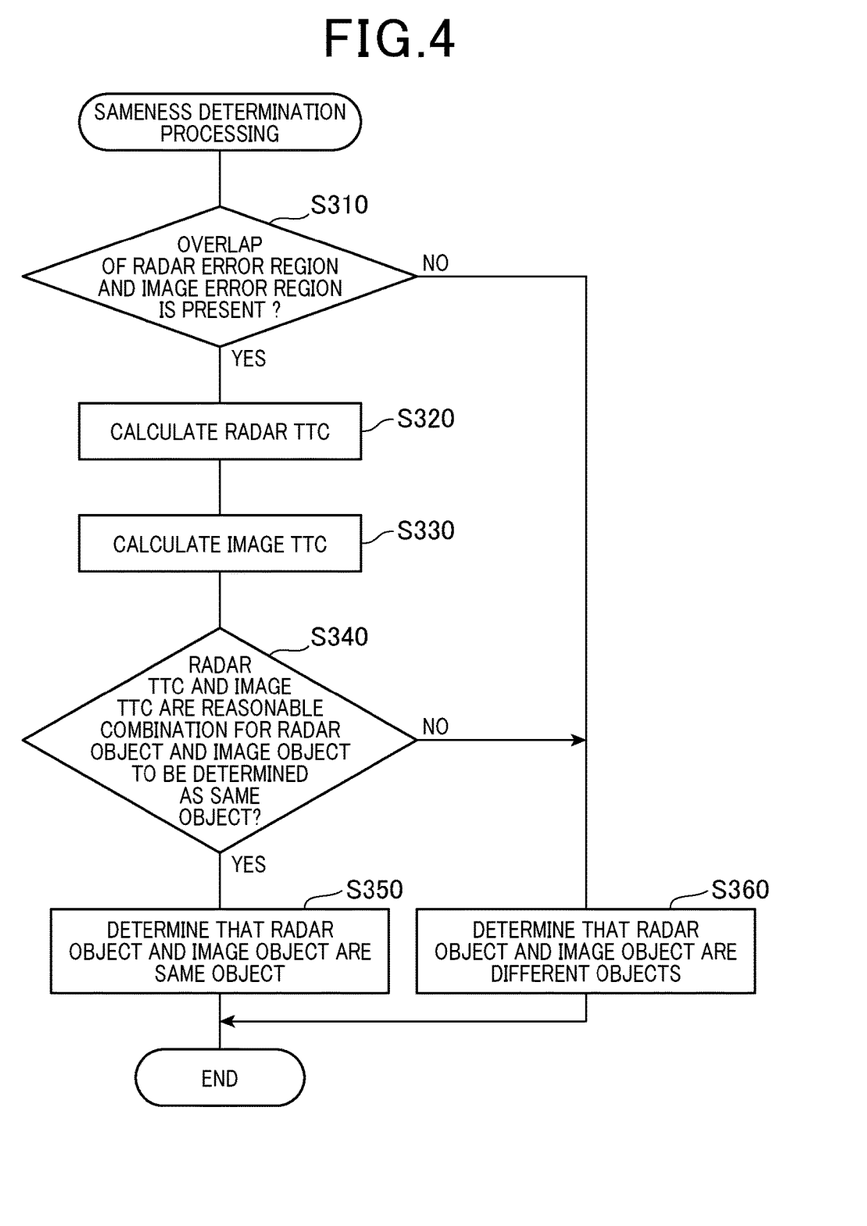
FIG. 4 is a flowchart of sameness determination processing included in the collision mitigation processing.

In the sameness determination processing, as shown in FIG. 4, the collision mitigation ECU 7 determines whether or not there is an overlap of the radar error region 21 and the image error region 22 in the XY-plane (step S310).

If it is determined that there is no overlap of the radar error region 21 and the image error region 22 (step S310; NO), then the process flow proceeds to step S360. If it is determined that there is an overlap of the radar error region 21 and the image error region 22 (step S310; YES), then the collision mitigation ECU 7 calculates a time to collision (TTC) with the radar object (referred to as a radar TTC) that is an estimated time until the own vehicle collides with the object (step S320).

The TTC can be calculated by dividing a relative distance from the own vehicle to the object by a relative speed of the object with respect to the own vehicle. In particular, the radar TTC can be calculated based on a result of the detection by the millimeter-wave radar 2.

Subsequently, the collision mitigation ECU 7 calculates a time to collision (TTC) with the image object (referred to as an image TTC) (step S330). In step S330, the image TTC is calculated based on a ratio of change in the size of the object in the captured image.

Figure 5:
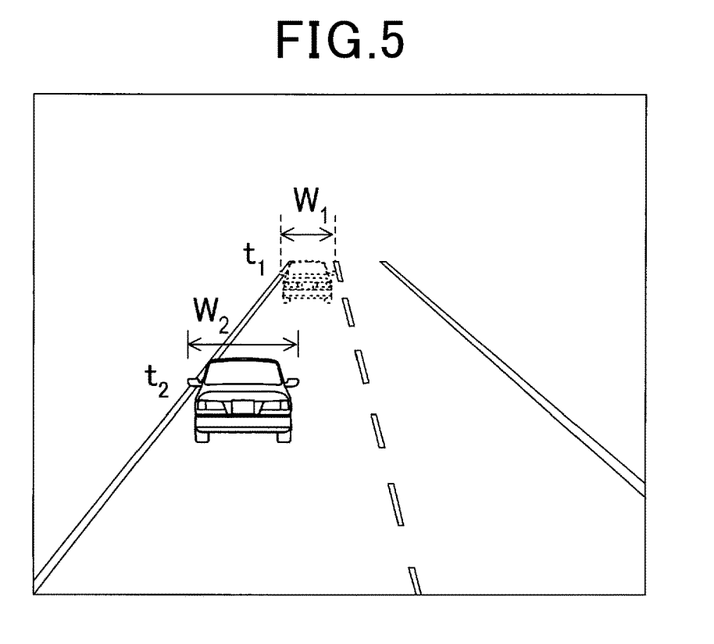
FIG. 5 is a pictorial diagram illustrating a ratio of change in width in the case of a vehicle as an object.
Figure 6:
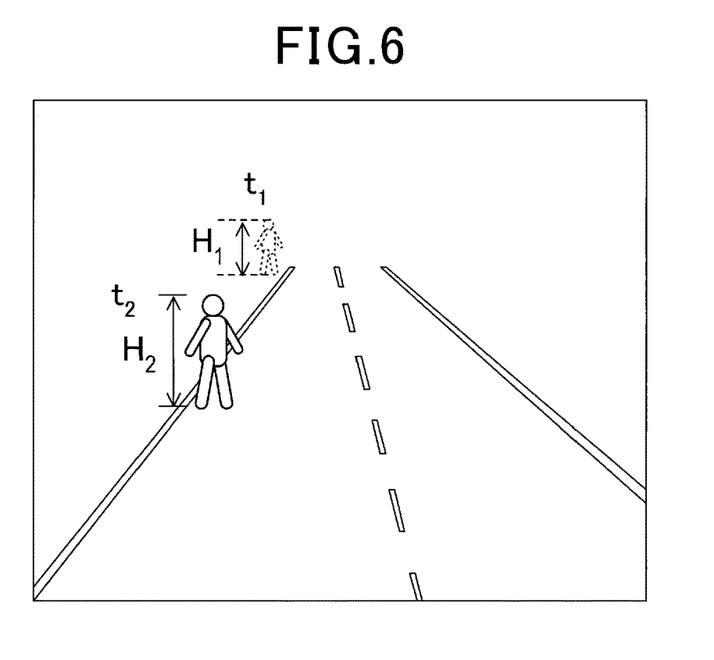
FIG. 6 is a pictorial diagram illustrating a ratio of change in height in the case of a pedestrian as an object.

For example, as shown in FIG. 5, in the case of a vehicle as a type of the image object, a width of the vehicle tends to be more accurately recognized than a height of the vehicle. Therefore, in this step, the ratio of change in the width of the vehicle is used to calculate a ratio of change in the size of the object. As shown in FIG. 6, in the case of a pedestrian as a type of the image object, a height of the pedestrian tends to be more accurately recognized than a width of the pedestrian. Therefore, the ratio of change in the height of the pedestrian is used to calculate a ratio of change in the size of the object.

More specifically, the image TTC, as a second collision time, can be calculated according to the following equation:

$$\text{image TTC} = A/(B-A)*(t2-t1),$$

where A is a length (height or width) of the object in the captured image acquired at t1 and B is a length of the object in the captured image acquired at t2 which is after the time t1.

The fact that the above equation can give the image TTC may be proved as follows.

$$\text{image TTC} = -(\text{relative distance})/\text{relative speed} = \\ -((\text{relative distance at } t2)/(\text{relative distance at } t2 - \text{relative distance at } t1))*\text{imaging time difference}.$$

Taking into account relative distance=focal length/horizontal resolution*actual width/length of object, $$\text{image TTC} = -(\text{actual length of object at } t2/B)/(\text{actual length of object at } t2/B - \text{actual length of object at } t1/A)*(t2-t1).$$

Since actual length of object at t1=actual length of object at t2, $$\text{image TTC} = -(1/B)/(1/B - 1/A)*(t2-t1).$$

Finally, image TTC=A/(B−A)*(t2−t1). That is, the image TTC can be calculated without directly using the relative distance and the relative speed of the object.

Subsequently, the collision mitigation ECU 7 determines whether or not the radar TTC and the image TTC are a reasonable combination for the radar object and the image object to be determined as the same object (step S340). That is, as shown in FIG. 3, if the image object is moving relatively in a direction indicated by the arrow 33 in which the image object is approaching the own vehicle and if the radar object is moving relatively in a direction indicated by the arrow 31 in which the radar object is approaching the own vehicle, it is likely that the radar object and the image object are the same object. If the image object is moving relatively in the direction indicated by the arrow 33 and if the radar object is moving relatively in a direction indicated by the arrow 32 in which the radar object is moving away from the own vehicle, it is less likely that the radar object and the image 32 object are the same object.

Therefore, for example, the collision mitigation ECU 7 calculates a difference between the radar TTC and the image TTC, and if the difference is equal to or less than a predetermined threshold, it is reasonable to determine that the radar object and the image object are the same object. If the difference is greater than the predetermined threshold, it is unreasonable to determine that the image object and the radar object are the same object.

If the radar ITC and the image TTC are a reasonable combination for the radar object and the image object to be determined as the same object (S340; YES), the process flow ends. If the radar TTC and the image TTC are not a reasonable combination for the radar object and the image object to be determined as the same object (S340; NO), the collision mitigation ECU 7 determines that the radar object and the image object are not the same object (step S360). Thereafter, the process flow ends.

Returning to FIG. 2, the collision mitigation ECU 7 performs collision mitigation control based on the position of the detected object and the degree of confidence (step S190). For example, if the own vehicle is likely to collide with the object (or if the probability of collision is equal to or greater than a predetermined threshold), the collision mitigation ECU 7 transmits a warning signal to an alert unit 6 to alert the driver. If the own vehicle is more likely to collide with the object, the collision mitigation ECU 7 instructs the engine ECU 5 to decrease a driving force of an internal-combustion engine and/or instructs the brake ECU 4 to increase a braking force of the own vehicle.

Figure 1B:
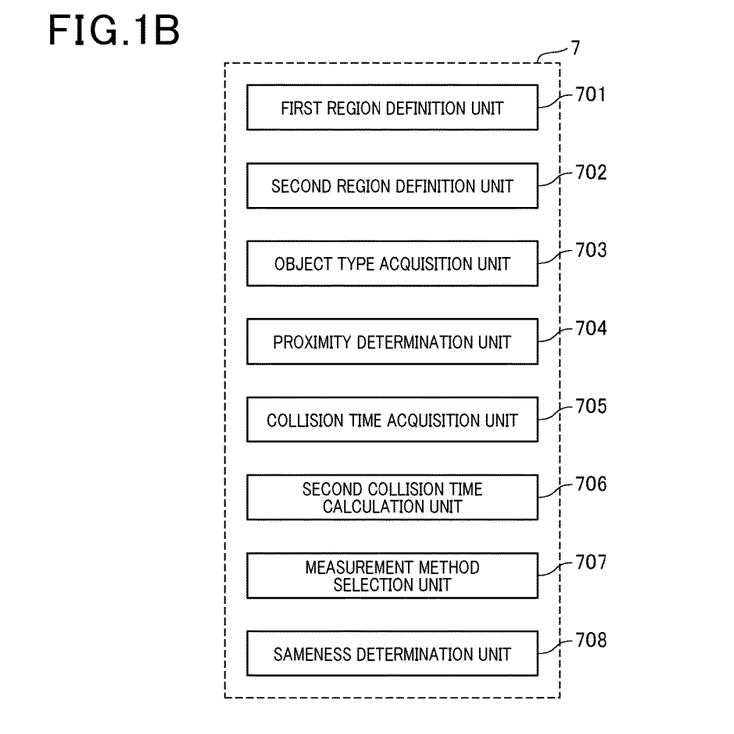
FIG. 1B is a functional block diagram of a collision mitigation ECU.

In the present embodiment, the collision mitigation ECU 7 corresponds to an object detection apparatus of the present invention. FIG. 1B illustrates a functional block diagram of the collision mitigation ECU 7. Various implementations of these blocks described herein can be realized in processor, in software, or in any combination thereof. The collision mitigation ECU 7 includes, as functional blocks, a first region definition unit 701, a second region definition unit 702, an object type acquisition unit 703, a proximity determination unit 704, a collision time acquisition unit 705, a second collision time calculation unit 706, a measurement method selection unit 707, and a sameness determination unit 708. The first region definition unit 701 performs steps S110-S120. The second region definition unit 702 performs steps S130-S140. The object type acquisition unit 703 performs part of the operation of step S130. The measurement method selection unit 707 performs step S330. The collision time acquisition unit 705 performs steps S320, S330. The proximity determination unit 704 performs step S310. The sameness determination unit 708 performs steps S340-S360. The second collision time acquisition unit 706 performs step S330.

(Advantages)

In the collision mitigation apparatus 1 described as above, the first region definition unit 701 of the collision mitigation ECU 7 is configured to define a first object region including a first detection point representing a relative position of the first object with respect to a reference point in an XY-plane with an X-axis direction of the XY-plane being a vehicle widthwise (or lateral) direction and a Y-axis direction of the XY-plane being a vehicle lengthwise (or longitudinal) direction, where the first object is an object detected based on detection information acquired from the millimeter-wave radar 2. The second region definition unit 702 of the collision mitigation ECU 7 is configured to define a second object region including a second detection point representing a relative position of a second object with respect to the reference point in the XY-plane, where the second object is an object detected based on a captured image acquired from the monocular camera 3. The collision time acquisition unit 705 of the collision mitigation ECU 7 is configured to acquire a first collision time with the first object and a second collision time with the second object. The sameness determination unit 708 of the collision mitigation ECU 7 is configured to, if there is an overlap of the first object region and the second object region in the XY-plane, that is, if it is determined by the proximity determination unit 704 that the first object and the second object are in close proximity to each other, and if a difference between the first collision time with the first object and the second collision time with the second object is less than a predetermined reference value, determine that the first object and the second object are the same object.

Such a configuration of the object detection apparatus, where not only if there is an overlap of the first object region and the second object region, but also if a difference between the first collision time with the first object and the second collision time with the second object is less than a predetermined reference value, it is determined that the first object and the second object are the same object, enables more accurate determination as to whether or not the first object and the second object are the same object.

In the collision mitigation apparatus 1, the second collision time calculation unit 706 of the collision mitigation ECU 7 is configured to calculate the second collision time based on a ratio of change in the size of the second object in the captured image.

With such a configuration of the collision mitigation apparatus 1, the second collision time can be acquired without measuring a distance to the second object.

In the collision mitigation apparatus 1, the second collision time calculation unit 706 of the collision mitigation ECU 7 is configured to calculate the second collision time (TTC) according to the following equation.

$$TTC = A/(B-A)*(t2-t1),$$

where A is a length of the object in the captured image acquired at t1 and B is a length of the object in the captured image acquired at t2 which is after the time t1.

With such a configuration of the collision mitigation apparatus 1, the second collision time can be calculated according to such a simple equation using the length of the object.

In the collision mitigation apparatus 1, the object type acquisition unit 703 of the collision mitigation ECU 7 is configured to acquire a type of the second object. The measurement method selection unit 707 of the collision mitigation ECU 7 is configured to select a measurement method for measuring the size of the second object, depending on the type of the second object. The second collision time calculation unit 706 measures the size of the object using the selected measurement method.

In such a configuration of the collision mitigation apparatus 1, an appropriate measurement method can be selected depending on the type of the object, which enables more accurate recognition of the size of the object.

OTHER EMBODIMENTS

The present invention is not in any way limited to the above embodiment. Reference numerals and signs used in the above description of the embodiment are appropriately used in the claims as well. The reference numerals and signs are used for easy understanding of the present invention, and should not be construed as limiting the technical scope of the present invention. The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

It should be appreciated that the invention is not to be limited to the collision mitigation apparatus 1 disclosed above and that the present invention can be implemented in numerous ways, including as a system that includes the collision mitigation apparatus 1 as a component, a program for enabling a computer to function as the collision mitigation apparatus 1, a storage medium storing such a program, a collision mitigation method and the like.

For example, in the above embodiment, the width or height of the object is used to calculate the image TTC. Any parameters representing the size of the object in the captured image, such as both of the width and the height of the object, may be used to calculate the image TTC. In cases where the relative speed and the relative distance have been detected prior to calculating the image TTC, the relative speed and the relative distance may be used to calculate the image TTC.

In addition, in the above embodiment, if it is determined that there is an overlap of the first region and the second region, then it is determined that the image object and the radar object are in close proximity to each other. Alternatively, if a distance between the coordinates Pr of the radar object and the coordinates Pi of the image object is less than a predetermined threshold, then it may be determined that the image object and the radar object are in close proximity to each other.

The invention claimed is:

1. An object detection apparatus mounted in a vehicle, comprising:
    a proximity determination unit configured to determine whether or not a first object and a second object are in close proximity to each other, the first object being an object detected based on detection information acquired from a radar, the second object being an object detected based on a captured image acquired from a monocular camera;
    an object type acquisition unit configured to acquire a type of the second object;
    a collision time acquisition unit configured to acquire a first collision time with the first object and a second collision time with the second object; and
    a sameness determination unit configured to, if it is determined that the first object and the second object are in close proximity to each other and if a difference between the first collision time with the first object and the second collision time with the second object is less than a reference value, determine that the first object and the second object are a same object,
    wherein the collision time acquisition unit is configured to, if the type of the second object is a pedestrian, acquire the second collision time with the second object based on a height of the pedestrian.

2. The apparatus according to claim 1, further comprising:
    a first region definition unit configured to define a first object region including a first detection point representing a relative position of the first object with respect to a reference point in an XY-plane with an X-axis direction of the XY-plane being a vehicle widthwise direction and a Y-axis direction of the XY-plane being a vehicle lengthwise direction; and
    a second region definition unit configured to define a second object region including a second detection point representing a relative position of the second object with respect to the reference point in the XY-plane,
    wherein the proximity determination unit is configured to, if there is an overlap of the first object region and the second object region in the XY-plane, determine that the object region and the second object region are in close proximity to each other.

3. The apparatus according to claim 1, wherein the collision time acquisition unit is configured to, if the type of the second object is a vehicle, acquire the second collision time with the second object based on a width of the vehicle.

4. The apparatus according to claim 1, further comprising a second collision time calculation unit configured to calculate the second collision time based on a ratio of change in the size of the second object in the captured image,
    wherein the collision time acquisition unit is configured to acquire the second collision time calculated based on the ratio of change in the size of the second object.

5. The apparatus according to claim 4, wherein the second collision time calculation unit is configured to calculate the second collision time TTC according to an equation:

$$TTC=A/(B-A)*(t2-t1)$$

with A being a length of the object in the captured image acquired at time t1 and B being a length of the object in the captured image acquired at time t2 which is after the time t1.

6. The apparatus according to claim 4, further comprising a measurement method selection unit configured to select a measurement method for measuring the size of the second object, depending on the type of the second object,
    wherein the second collision time calculation unit is configured to measure the size of the object using the measurement method selected by the measurement method selection unit.

* * * * *